June 1, 1943.  R. L. WILSON  2,320,809
CONTROL APPARATUS
Filed Jan. 9, 1942 5 Sheets-Sheet 3
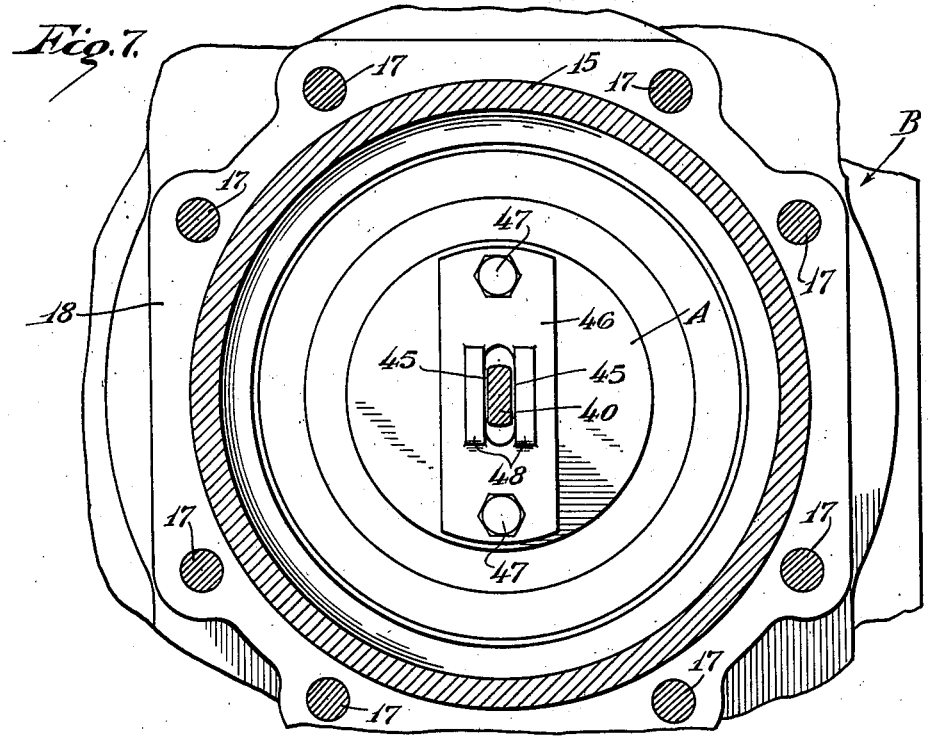
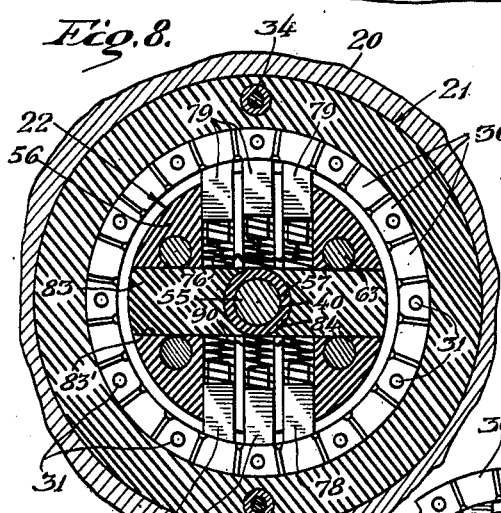
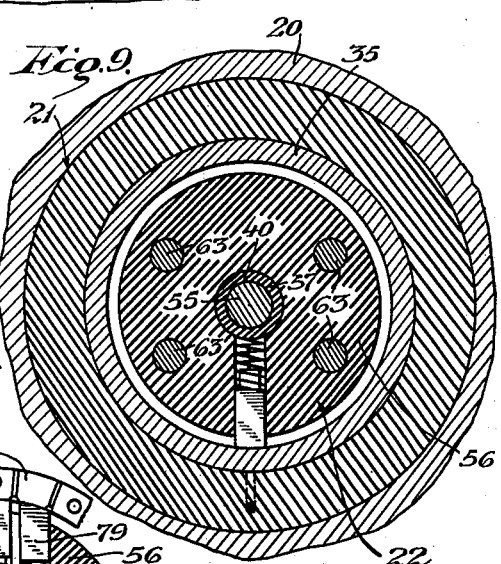
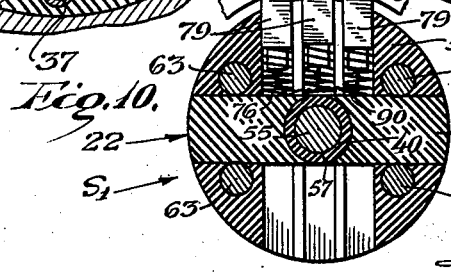
Inventor:
Rosser L. Wilson
By Wallace & Cannon
Attorneys

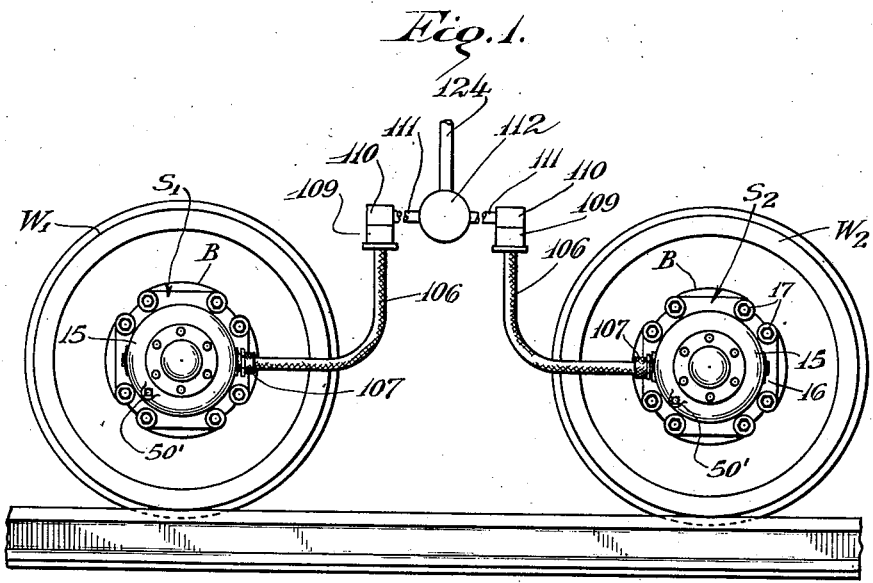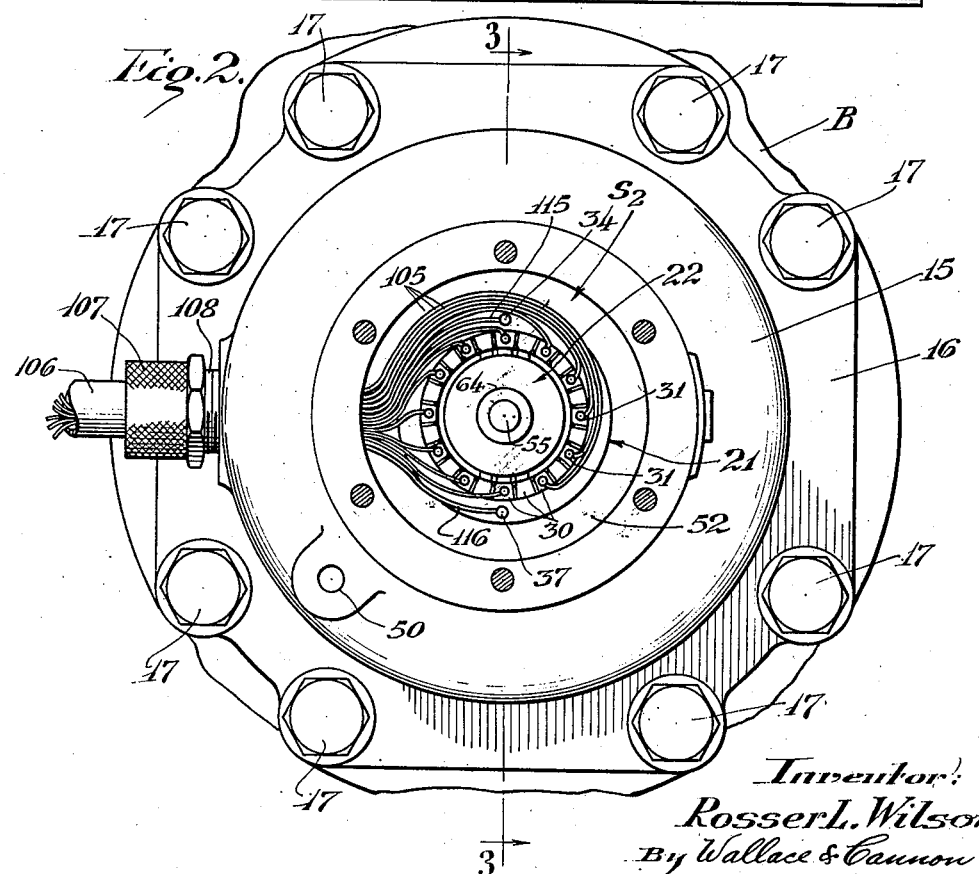

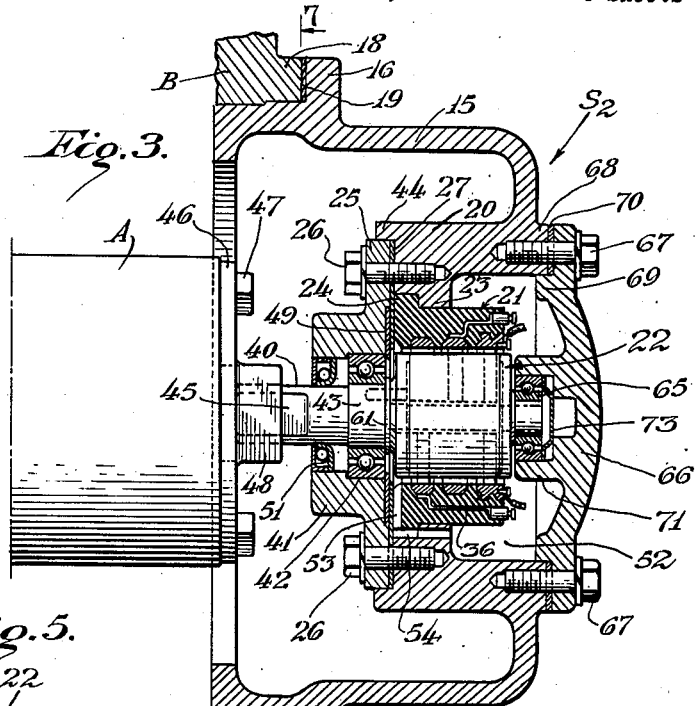

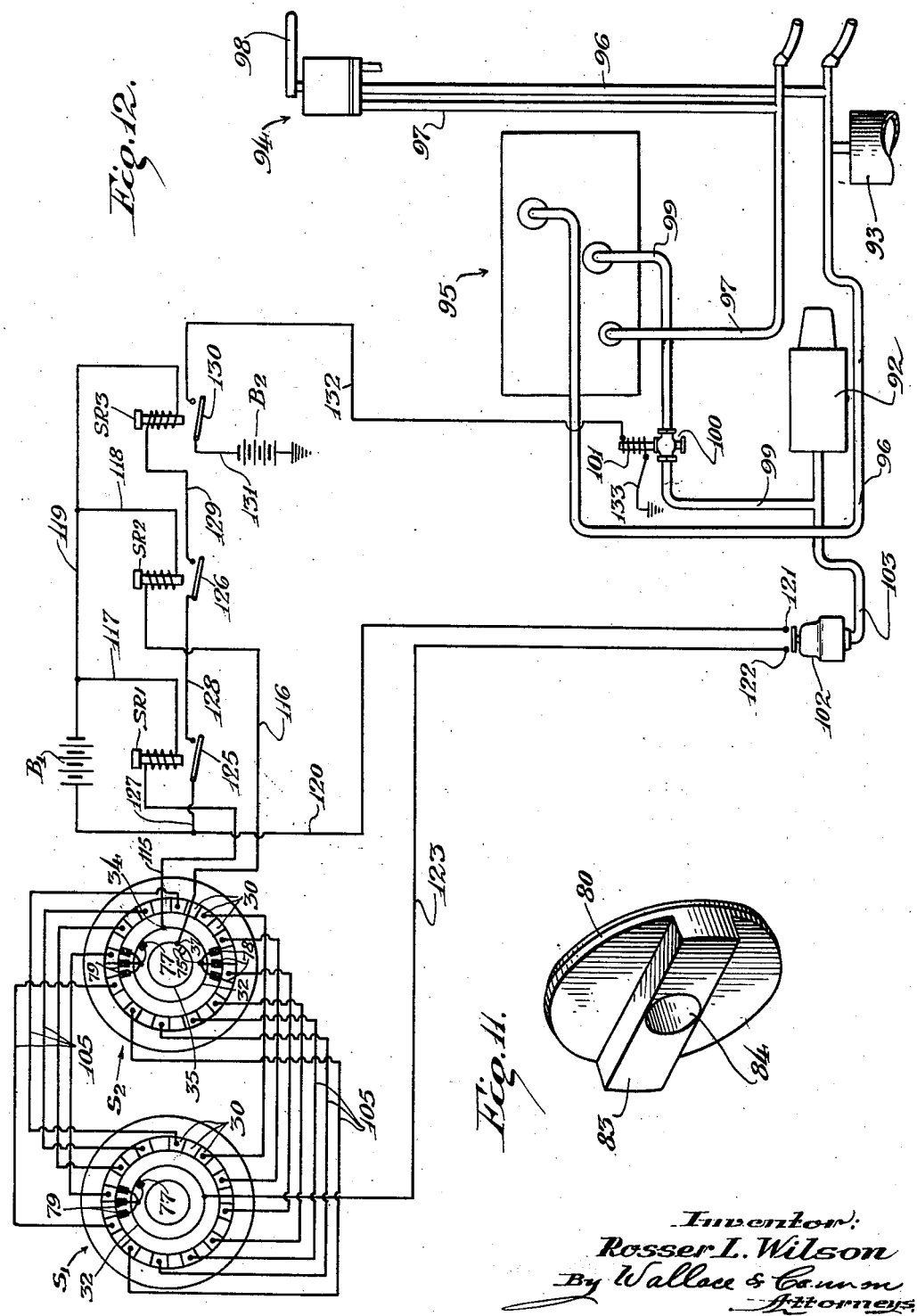

Patented June 1, 1943

2,320,809

UNITED STATES PATENT OFFICE 2,320,809

CONTROL APPARATUS

Rosser L. Wilson, Mahwah, N. J., assignor to The American Brake Shoe and Foundry Company, Wilmington, Del., a corporation of Delaware Application January 9, 1942, Serial No. 426,118

29 Claims. (Cl. 303—21)

This invention relates to control apparatus for railway and like equipment, and specifically to apparatus for controlling the effectiveness of railway braking and like equipment to the ultimate end that sliding of the wheels will be prevented during braking or other operations.

Among the expedients to which resort has been made heretofore to prevent sliding of the wheels of railway and like equipment during braking or other operations are those which embodied elements mounted in close association with one or more of the wheels for operation by or rotation with such wheel or wheels. The elements so associated with the wheels of the equipment may constitute all or merely part of a detecting means operable to sense an operating condition indicative of at least an incipient wheel sliding condition, and such detecting means have been operative to institute a control operation to prevent or alleviate wheel sliding. Such a control operation, for example, may constitute effecting a reduction in the braking pressure, a short period of release of the braking pressure, or suitable operation of a rail sander, any one or any combination of which tends to alleviate the undesirable tendency toward sliding of the wheels or actual sliding of the wheels.

The elements which must be thus associated with the wheels of the equipment may comprise commutator switches, inertia operated switch means, electric generator means, or the like, but in every such instance the operative association of such elements with the wheels of the equipment must be attained in such a manner as to insure long and dependable service and also the arrangements should require but a minimum of space and be of such nature as to afford ready access thereto, as well as to other parts of the railway equipment located adjacent such elements, and to enable the foregoing to be accomplished in a novel manner is an important object of this invention.

It is also an object of this invention to enable at least selected of the operative elements, of a control apparatus of the aforesaid character, which are to be associated with the wheels of the railway equipment to be mounted on the journal boxes of the equipment in such a way as to permit ready access to such elements and to the journal boxes and also to insure convenience of installation, inspection and removal of these operative elements.

A further object of the present invention is to simplify the construction of the wheel slip detecting or like devices by housing such device in the cover of a journal box, thus enabling the cover and detecting device to be removed bodily as a unit when it is desired to have access to the journal box, and an ancillary object is to enable ready access to the interior parts of the detecting device itself without removal of the journal box cover whenever this is desired.

A further object is to afford an arrangement of the aforesaid character which will occupy a minimum space and which may nevertheless be readily serviced, assembled and installed.

A still further object is to provide a novel commutator switch having a minimum number of moving parts and which is durable and dependable in service.

A yet further object is to incorporate a novel switching means in a system including conventional or other pneumatically operated braking means so as to enable modification or suspension of the normal braking operations during the time any of the wheels of the equipment having such a system associated therewith tend to slide, or actually slide, along the rails or other surfaces upon which the equipment is rolling.

Other and further objects of the present invention will be apparent from the following description and claims and are illustrated in the accompanying drawings which, by way of illustration, show preferred embodiments and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings,

Fig. 1 is a partially schematic elevational view of a pair of wheels such as are provided at one side of a truck on railway equipment and with which my invention is associated;

Fig. 2 is an elevational view of a combination journal box cover with a portion thereof removed to show the manner in which the commutator switch is disposed interiorly of this cover;

Fig. 3 is a longitudinal sectional view taken substantially on the line 3—3 on Fig. 2;

Fig. 4 is an enlarged longitudinal sectional view of certain portions of the apparatus shown in Fig. 3;

Fig. 5 is an elevational view of a brush retainer cap showing one manner in which it may be mounted on a rotatable portion or rotor of the commutator switch of my invention;

Fig. 6 is a plan view of the rotor of the switch;

Fig. 7 is a transverse sectional view taken on the line 7—7 on Fig. 3;

Figure 13:
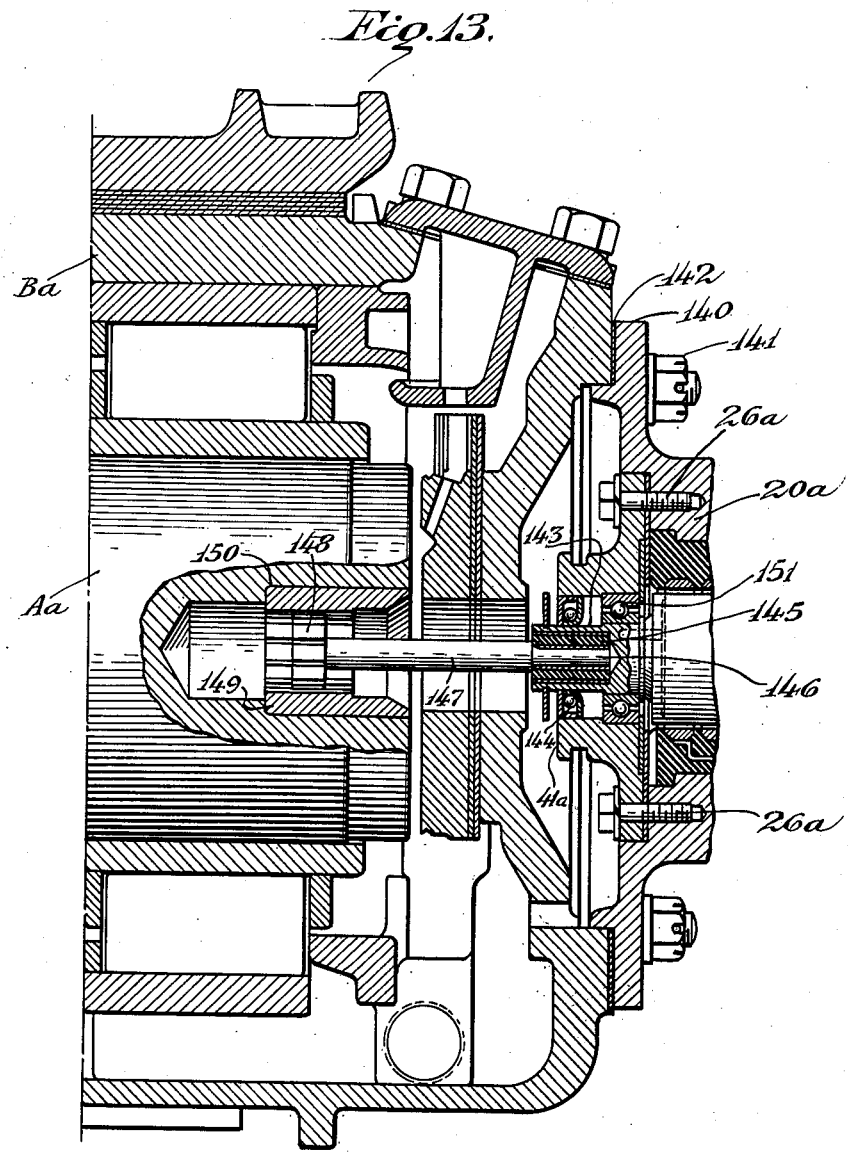

Figs. 8 and 9 are transverse sectional views taken substantially on the lines 8—8 and 9—9, respectively, on Fig. 4;

Fig. 10 is a transverse sectional view similar to Fig. 8 but illustrating a slightly different type of switch;

Fig. 11 is a perspective view of the brush retainer cap shown in Fig. 5;

Fig. 12 is a diagrammatic view of my invention as embodied in a brake control system; and Fig. 13 is a view similar to Fig. 3 but showing my novel switch in association with a different type of journal box than that shown in Fig. 3.

My novel control apparatus is particularly adapted for use on railway equipment and the like to detect any tendency of the wheels of such equipment to slide or slip on the rails instead of normally rolling thereon, and it may be employed to control the operation of other means which functions to correct such tendency. Examples of control apparatus of the general character to which the present invention relates are disclosed in my United States Letters Patent Nos. 2,232,750 and 2,232,752, both patented February 25, 1941. Such devices operate in dependence upon a principle inferred from numerous observations in practice, namely, that the wheels on separate axles of the same vehicle or truck do not maintain equal rotative speeds when a condition tending toward wheel sliding arises. Thus, where the wheels encounter a slippery portion of the rail while being decelerated in the course of a braking operation of the equipment (assuming this produces a tendency toward sliding of the wheels) it has been observed that a wheel or the wheels on one axle will start to slow down before the wheel or wheels on a companion axle so start. If this condition persists, then the one set of wheels may become locked and slide along the rails before the other set of wheels and while the other set are still moving. Such variation in rotative speeds of the respective wheels develops a perceptible time prior to any actual sliding of the wheels. Therefore, in order to detect a tendency toward wheel sliding before any sliding actually occurs, the rotative speeds of the wheels on two or more axles may be compared, and if an appreciable difference is detected, then a control operation, such as sanding the track or releasing or reducing the effectiveness of the brakes may be effected to thereby restore normal rolling of the wheels.

The present invention contemplates the use of a detecting means including commutator switches which are respectively associated with the wheels whose speeds of rotation are to be compared in accordance with the foregoing. Thus, referring to Fig. 1, two commutator switches S1 and S2 are respectively positioned in association with two wheels W1 and W2 that are respectively mounted on the axles as A, Fig. 3, of a truck (not shown). Each of the commutator switches S1 and S2 is supported in a housing 15, Figs. 2 and 3, which constitutes the cover of a journal box B (only a fragment of which is shown in these views) for the respective axle A. These switches S1 and S2 are generally of identical construction except that the switch S2 includes certain parts which are omitted from the switch S1, as will be explained in detail hereinafter. For convenience in describing the respective functions of the two switches S1 and S2, the switch S1 will occasionally be referred to as the master switch, and the switch S2 as the secondary switch.

As shown in Figs. 2, 3 and 7, the journal box cover or switch housing 15 has a generally cylindrical exterior surface on which an annular flange 16 is formed intermediate the ends of the housing 15. The flange 16 is secured by bolts 17 to a cooperating flange 18 on the outer face of the journal box B, a suitable gasket 19 being interposed between the flanges 16 and 18. As thus mounted, the cover 15 is concentric with respect to the axle A and extends for a short distance interiorly of the journal box B, the inner end of the cover 15 being open and terminating near the plane in which the outer end of the axle A lies. Preferably a neat fit is afforded between the journal box B and the cover 15 so that the cover is accurately centered with respect to the axle A. The outer portion of the cover or housing 15 extends a substantial distance beyond the free end of the journal box B and axle A. Moreover, a cylindrical boss 20 is disposed concentrically within the housing 15 and extends inwardly toward the end of the axle A but terminates in spaced relation therewith. This boss 20 serves to support various parts of the switch structure, as will be explained presently.

As used in the present description, the term "inner" or "inwardly" means toward the left as viewed in Fig. 3, or toward the axle A, and "outer" or "outwardly" means toward the right as viewed in Fig. 3, or away from the axle A. On the other hand, the words "interior" or "interiorly" and "exterior" or "exteriorly" refer to relative positions radially of the axis of the cover 15.

Each switch as S2 comprises a stationary portion 21, Figs. 4 and 8, referred to herein as the stator, and a cooperating rotatable portion 22, referred to herein as the rotor. These parts are made of suitable insulating material such as Bakelite and have embodied therein certain electrical conducting elements which are included in the control circuits of the apparatus, to be described in detail hereinafter. The rotor 22 is connected to the axle A to be driven thereby and cooperates with the stator 21 to selectively establish or interrupt the aforesaid control circuits.

In the present instance, the stator 21 is disposed interiorly of the boss 20 and has a cylindrical opening extending through it for the reception of the rotor 22, which is likewise of cylindrical configuration. The stator 21 is supported by a web 23 formed on the interior wall of the boss 20, an annular flange 24, Fig. 4, on the inwardly disposed end of the stator 21 being seated in a suitable recess in the web 23 to restrain the stator against outward movement relative to the boss 20. The inner face of the stator 21 is flush with the adjoining portion of the boss 20 and is engaged by the flat face of a hub-shaped retaining member 25, Fig. 3, which is secured to the boss 20 by screws 26, a gasket 27 being interposed between the member 25 and the stator 21. Thus the stator 21 is securely retained in the desired non-rotative relation within the boss 20.

A series of circularly arranged commutator bars 30, Figs. 4 and 8, of conductive material are imbedded in the insulating material of the stator 21 flush with the interior and outer end surfaces thereof. Small cap screws 31 are threaded into the outer ends of alternate ones of these commutator bars 30 to enable the ends of wires or conductors 105, Fig. 2, to be clamped in electric contact with such commutator bars. The intervening commutator bars are insulated from the aforesaid alternate commutator bars and, in the present instance, are left disconnected from any external circuits. Inwardly of the commutator 30 a continuous conductive ring 32, Fig. 4, is imbedded in the insulating material flush with the interior cylinder surface of the stator 21. This ring 32 is electrically connected by a metal bar 33, which is molded into the insulating body of the stator 21, to a binding post 34 protruding from the outer face of the stator 21. Another continuous conductive ring 35 is imbedded in the stator 21 inwardly of the ring 32 and is similarly connected by a bar 36 to a binding post 37 on the outer face of the stator 21.

The rotor 22 is mounted upon a shaft 40, Figs. 2, 3 and 4, which extends through the hub 41 of the retaining member 25, this hub extending inwardly from the base of the member 25 toward the end of the axle A. A ball bearing 42 carried by the retaining member 25 is snugly fitted on a bearing portion 43 of the shaft 40 to support the shaft 40 in axial alignment with the axle A. To insure accurate centering of the shaft 40 relative to the axle A, an annular recess is formed in the inner end of the boss 20 to receive the retaining member 25, the rim 44, Fig. 3, of this recess fitting accurately around the periphery of the member 25.

The ball bearing 42 is received in a recess within the hub of the retaining member 25 and is retained in place by a washer 49 which is seated in a shallow recess in the outer end of the retaining member 25 abutting the gasket 27 and which bears against the exterior race of the ball bearing 42 to maintain the ball bearing seated in the retaining member 25. The shaft 40 extends inwardly from the ball bearing 42 into proximity with the outer end of the axle A, and this portion of the shaft 40 is, in this form of my invention, flattened on opposite sides as indicated at 45, Figs. 4 and 7, so that it may pass between a pair of spaced lugs 48 on a plate 46, Figs. 3 and 7, which is secured to the end of the axle A by screws 47. The lugs 48 grip the flat surfaces 45 of the shaft 40 and cause the shaft 40 to rotate with the axle A when the vehicle is in motion. Because of the accurate interfitting of the various switch parts, as described hereinabove, the shaft 40 is maintained coaxially with respect to the axle A and hence there is no tendency to produce undue strains or wear such as might result from even a slight eccentricity of the shaft 40 in relation to the axle A.

The interior of the journal box cover 15 communicates freely with the interior of the journal box B as shown in Fig. 3 and hence a pool of lubricant (not shown) in the space intermediate the boss 20 and the bottom wall of the cover 15 serves as a sump for the lubricant utilized in the journal box. Lubricant may be introduced into the interior of the journal box B and journal box cover 15, without the removal of the cover from the box, through an opening 50, Fig. 2, in the cover 15. The opening 50 is disposed a predetermined distance above the lowermost part of the cylindrical shell of the cover 15 to thereby determine the permissible height of the pool of lubricant when the vehicle is at rest. A pipe plug 50′, Fig. 1, is employed to close the opening 50 after introduction of the lubricant into the journal box. To prevent lubricant from forcing its way into the interior of the boss 20 where the switch parts are located, a sealing ring or oil seal 51, Fig. 3, is mounted about the shaft 40 within the hub 41 of the member 25 inwardly of the ball bearing 42. However, since some lubricant may seep past the ring 51 and bearing 42, means is provided for draining such lubricant to the bottom of the annular chamber 52 surrounding the stator 21 within the boss 20. Thus, as shown in detail in Figs. 3 and 4, a passage 53 leads downwardly along the inner end of the stator 21 adjacent the gasket 27, Fig. 3, and communicates with a horizontal passage 54 extending through flange 24 of the stator 21 and through the web 23 of the boss 20. The passage 54 communicates with the aforesaid annular chamber 52 at the lowermost part thereof so that any lubricant which seeps from the journal box past the sealing ring or seal 51 and ball bearing 42 is enabled to collect at the bottom of the chamber 52 where it has no tendency to come into contact with the electrically conductive elements of the switch S2.

In the present instance, the rotor 22 is positioned interiorly of the stator 21 and is mounted upon a reduced outer end portion 55 of the shaft 40 as shown in Figs. 4 and 9. This rotor comprises a cylindrical body 56 of insulating material mounted upon an insulating sleeve 57 which is snugly fitted on the reduced portion 55 of the shaft 40. An end plate 58 is anchored to the body 56 at the inner end thereof and carries a pin 59 which projects longitudinally inwardly therefrom and is received in a hole 60 which extends longitudinally for a short distance into the shouldered portion 43 thereof adjacent the reduced portion 55, an annular flange 61 being formed on the shaft 40 at this position. The inner end plate 58 abuts the flange 61. An end plate 62 is anchored to the outer end of the insulating body 56 of the rotor 22, the two end plates 58 and 62 and the body 56 being secured together by longitudinally extending screws 63. A boss 64, in this instance, projects outwardly from the end plate 22 over the reduced portion 55 of the shaft 40.

As shown, the boss 64 of the end plate 62 is journaled in a ball bearing 65 carried by a lid or cap 66, Fig. 3, which is fastened by screws 67 to an annular flange or shoulder 68 provided on the extreme outer end of the boss 20, a gasket 70 being interposed between the flange 68 and the adjoining part of the lid 66. This lid 66 has an annular shoulder 69 which extends for a short distance inwardly of the boss 20 and is accurately interfitted therewith so as to insure proper centering of the bearing 65. The ball bearing 65 is seated within a boss 71 on the inner face of the lid 66, and the interior race of the bearing 65 abuts a shoulder 72, Fig. 4, which is formed on the end plate 62 at the junction thereof with the boss 64. The exterior race of the ball bearing 65 is engaged by a spring washer 73 positioned within the boss 71 of the lid 66, this spring washer urging the bearing 65 and rotor 22 inwardly so that the inner end plate 58 of the rotor 22 is maintained in engagement with the flange 61 on the shaft 40. The flange 61, in turn, bears against the interior race of the ball bearing 42, and thus all the parts of the rotor 22 are maintained in predetermined relation with each other axially with respect to the axle A.

The rotor 22 carries several brushes of conductive material which are adapted to have wiping contact with the conductive rings 32 and 35 and the commutator 30 respectively. Thus, a brush 75, of square cross-section is positioned in an opening extending radially through the insulating body 56 of the rotor 22 to cooperate with the conductive ring 35 on the stator 21, Figs. 4, 6 and 9. The opening in which the brush 75 is mounted extends to the surface of the interior sleeve 57, and a spring 76 is interposed between the base of the brush 75 and the sleeve 57 to urge the brush 75 into engagement with the surface of the ring 35. Similarly, a brush 77 carried by the rotor 22 cooperates with the conductive ring 32 on the stator 21, a spring 76 being interposed between the base of this brush and the sleeve 57 to urge the brush 77 into engagement with the ring 32. The rotor 22 is likewise provided with two sets of brushes 78 and 79, Figs. 4, 6 and 8, each set comprising three closely spaced brushes which are adapted to have wiping contact with individual commutator bars 30. These brushes 78 and 79 are slidably mounted in guideways which are cut into the outer end of the insulating body 56 of the rotor 22. The central guideways of the two sets of brushes 78 and 79 extend radially in opposite directions from the sleeve 57 through the insulating body 56, and the other brush guideways are disposed parallel thereto and on opposite sides thereof. A brush retaining cap 80 of insulating material, Figs. 4, 5, 6 and 11 abuts the outer face of the body 56 and is retained in position by the outer end plate 62 which has a circular lip 81, Fig. 4, which fits in an annular recess 82, Fig. 5, provided in the cap 80. A ledge 83, Figs. 5 and 11, extends diametrically across the inner face of the cap 80 and is integral therewith, and this ledge 83 fits in a diametrical groove 83', Figs. 5 and 8, in the outer end of the insulating body 56. A circular opening 84 is provided in the center of the cap 80 and ledge 83 to enable passage of the sleeve 57 and reduced portion 55 of shaft 40 therethrough. The springs 76 for the brushes 78 and 79 seat on opposite edges of the ledge 83 and urge their respective brushes radially into engagement with the commutator bars.

The openings in which the brushes 75 and 77 are received are respectively interconnected with the openings in which the centrally located brushes 78 and 79 are disposed by narrow slots 85, Figs. 4 and 6, in the insulating body 56 and having a depth equal to that of the brush guide openings. The brushes 79 are spaced from each other as shown in Fig. 6 by narrow projections 86 of the insulating body 56, and it will be observed that these projections 86 terminate in spaced relation with the inner face of the cap 80 to thereby define passageways interconnecting these brush guide openings. In a similar manner the guide openings in which the brushes 78 are disposed communicate with each other. In the form shown, each brush 75, 77, 78 and 79 has a lead or a wire 90 which is molded into the brush and extends from the base thereof. The leads 90 from the brush 77 at the central brush 79 are run longitudinally through the intervening slot 85 and are soldered together as shown in Figs. 4 and 6. The lead 90 from the central brush 79 is likewise soldered to the leads 90 of the two other brushes 79 which are extended through the aforesaid passageways interconnecting the brush guide openings. Thus the brushes 77 and 79 are electrically interconnected with each other and, in this respect, it is to be understood that, if desired, resort could be had to other arrangements for effecting such electrical interconnection. Moreover, and for the same reason and, in this instance, in a manner similar to that described, the leads 90 of the brushes 75 and 78 are electrically interconnected. The illustrated arrangement of the brushes and brush leads enables removal of an entire brush assembly, such as that comprising the brushes 77 and 79, from the rotor 22 without disassembling the rotor, the interconnected leads 90 passing freely through the slot 85 and the passageways interconnecting the guide openings for the brushes 79 when the brush assembly is lifted out. This also facilitates inserting the brush assemblies in the rotor. However, as stated, resort could be had to other arrangements which, if desired, could embody this advantageous feature.

Thus far, the construction of the secondary commutator switch S2 has been described in detail. The master commutator switch S1 is constructed in an identical manner except that, as shown in Fig. 10, no brushes as 78 or 75, Figs. 4 and 8, are provided in such a switch. However, the usual brush guide openings for accommodating brushes such as 75 and 78 are nevertheless provided so that the rotor parts may be uniformly manufactured and therefore interchanged if necessary. Brushes as 77 and 79, Fig. 4, are provided in the rotor of the master switch S1, Fig. 10, and are electrically interconnected in a manner described hereinabove with respect to the secondary switch S2.

It is manifest from the foregoing description that the electrically conductive parts and related parts of each commutator switch as S2, Figs. 3 and 4, are so disposed in the journal box cover 15 that the entire switch mechanism may be removed as a unit with the cover 15 when it is desired to have access to the interior of the journal box B. Since the shaft 40 is free to be withdrawn from between the spaced lugs 48 on the driving plate 46, this shaft is carried with the switch structure when the cover 15 is removed from the journal box B. Thereafter the stator 21 and rotor 22 may be removed from the cover 14 by loosening the screws 26 and withdrawing the retaining member 25 from the boss 20 of the cover 15, whereupon the stator 21 and rotor 22 may be withdrawn from the boss 20 and separated from each other. In those instances where it is desired to inspect the switch structure without removing the journal box cover 15, this may be done by loosening the screws 67 and withdrawing the lid or cap 66. This exposes the commutator connections, as shown in Fig. 2, and it also enables the rotor 22 to be withdrawn from association with the stator 21 for the purpose of replacing the rotor brushes or for any other reason.

Inasmuch as the present invention is primarily adapted for use with control apparatus effective to prevent the sliding of the wheels of railway or like equipment and since such apparatus is particularly useful in the course of a braking operation effected on railway equipment, I have, in Fig. 12, schematically illustrated my invention in association with one form of apparatus that may be used for effecting a braking operation on railway equipment. It is to be understood, however, that while I have illustrated and will now describe a particular form of railway brake equipment, resort could be had to other forms of braking apparatus and, as has been explained, since my invention is not limited to use with railway equipment, my invention could well be incorporated with braking or other equipment associated with the wheels of any vehicle.

To refer, however, to the disclosure of Fig. 12,

I have there shown a brake pipe 96 which, in the manner well understood in the art, leads from a source of fluid under pressure and which, in the present instance, is connected to a source of air under pressure represented by the fragmentally illustrated reservoir 93. In the present instance a manually operated valve, generally indicated by 94, is utilized for controlling the admission of air under pressure from the brake pipe 96 to the brake cylinder 92 which, in the conventional manner, has operative means therein connected to the usual brake rigging associated with the braking means that function to effect deceleration of the wheels with which, in the present instance, the novel detecting means of the present invention, th switchs S1 and S2 and associated parts, are operatively associated.

The manually-operated valve 94 I have shown may be of the so-called self-lapping type and when the handle 98 thereof is manipulated, this is effective to bring about application and release of the brakes. This valve is also effective to control the degree of application of the brakes so as to thereby bring about a braking operation in accordance with the particular conditions encountered at the time the particular braking operation is to be effected as, for example, so as to bring about either a normal braking operation or an emergency braking operation.

Upon manipulation of the handle 98 of the valve 94, air is admitted from the brake pipe 96 and the reservoir 93 to the control pipe 97 which, in the present instance, leads to a control valve 95 of a well-known type and which is effective to regulate the admission of air under pressure from the brake pipe 96, which leads to the valve 95, to the pipe 99 that leads from this valve to the brake cylinder 92. As is well understood, air under pressure admitted to the pipe 97 through the valve 94 so effects operation of the valve 95 that air under pressure in a degree proportionate to that admitted into the control pipe 97 is admitted from the pipe 96 through the pipe 99 to the brake cylinder 92.

It has been found to be advantageous to bring about a control operation to prevent wheel sliding through the intermediary of means which functions independently of the normal control for the brakes and where this is to be done it may be effected, as in the present instance, by incorporating a vent-check valve 100 in the pipe 99 intermediate the valve 95 and the brake cylinder 92. In the present invention the vent-check valve 100 includes a solenoid 101 which, when energized, is effective to so operate the valve 100 as to prevent the flow of air through the pipe 99 beyond the valve 100 but at the same time such operation of the valve 100 is effective to connect that part of the pipe 99 intermediate the valve 100 and the cylinder 92 with the atmosphere so as to thereby enable venting of the brake cylinder 92. Normally, however, the solenoid 101 of the valve 100 is deenergized so that air under pressure may flow therethrough from the valve 95 to the brake cylinder 92 without there being any venting of the air so supplied to the atmosphere. Thus when the solenoid 101 of the valve 100 is energized in the course of a braking operation, the brake cylinder 92 will be vented irrespective of the condition of the valve 95 and the manually operated valve 94 that controls operation of the valve 95.

Furthermore, in those instances where the solenoid 101 is energized so as to vent the brake cylinder 92, this may be so effected so as to bring about release of the brakes that are applied by operative means that are included in the brake cylinder 92 or the venting to the atmosphere of the brake cylinder 92 may be such as to reduce the effectiveness of such braking means. Moreover, when the cylinder 92 is vented to the atmosphere upon energization of the solenoid 101 so as to thereby relieve the retarding forces effective on the wheels, the tendency toward wheel sliding or actual wheel sliding is alleviated, and if a supply of air under pressure is still available to the brake cylinder through, as in the present instance, the valve 95, the deenergization of the solenoid 101 will result in reapplication of the brakes to the wheels and the resumption of the braking operation which was in progress at the time the solenoid 101 was energized. Thus, in the illustrated form of the invention, a control operation is brought about which effects energization and deenergization of the solenoid 101 and in the present instance such energization and deenergization of the solenoid 101 is effected under control of the switches S1 and S2.

Thus, the two commutator switches S1 and S2, as has been stated hereinabove, may be associated with different axles of a truck so that rotors thereof are driven in timed relation with the respective wheels on these axles. Alternate commutator bars 30 of each of these switches are, in the present instance, electrically connected to corresponding commutator bars of the other switch, these connections being represented in Fig. 12 by the conductors 105 which extend between the two commutators. Structurally, the wires 105 leading from the commutator bars 30 of each switch S1 or S2 are led from the area 52, Fig. 3, within the boss 20 of the switch housing 15, through a nipple 108, Fig. 2, and thence into a flexible conduit 106 which has the adjacent end thereof secured to the nipple 108 by the fitting 107. The opposite end of each conduit 106 is fast to a plug 109 which has posts (not shown) thereon to which the wires 105 in the conduit 106 are respectively connected, such posts being respectively insertable in sockets afforded in a receptacle 110 supported on the frame of the truck. It will be understood, of course, that these posts may be provided in the receptacles 110 rather than in the plug 109. There is a receptacle 110 for each conduit 106 and plug 109, and the sockets (not shown) in these receptacles are respectively electrically interconnected. The plugs 109 and receptacles 110 are separable to enable the conductors leading from each switch to be disconnected from each other when this is desired, and moreover they are preferably so arranged that they may be interconnected in but one way.

Thus, the conductors 105, Fig. 2, leading from each of the switches S1 and S2 are electrically connected to each other through the medium of the plugs 109, sockets 110 and wire running from these sockets through conduits 111 leading to a junction box 112. It will be understood that if desired wires as 105 may be connected to each commutator bar 30 of a switch S1 or S2 instead of to every other bar thereof as shown. However, the detecting means may be made sufficiently sensitive for most purposes by merely wiring alternate commutator bars together as is done in the present instance. Moreover, this arrangement enables the master switch S1 to be associated with two secondary switches as S2 if desired, in which case all of the commutator bars of the master switch S1 are utilized. In such circumstances the even numbered bars of the master switch, for example, may be connected to corresponding commutator bars of one of the secondary switches as S2 while the odd numbered bars thereof are connected to corresponding bars of the other secondary switch. An arrangement of this character is disclosed in my copending application Serial No. 366,987, filed November 25, 1940.

Since some lubricant may collect in the bottom of the chamber 52, Fig. 3, particularly when the apparatus has been in use for a long period of time, I prefer to arrange the conductors 105, Fig. 2, around the commutator 30 in such a way that they will not come into contact with any lubricant that may collect at the bottom of the chamber 52. I accomplish this in the present instance by leading most of the conductors 105 around the top of the stator 21 so that they are firmly supported for the greater part of their respective lengths, some of these conductors extending for as much as three quarters of the distance around the periphery of the stator. Only in the case of the commutator bars 30, situated close to the nipple 108 are the wires 105 run directly into the nipple without passing around the stator 21. In this way the wires are prevented from sagging downwardly below the stator 21 and moreover there is no piling up of the conductors beneath the commutator 30. Hence, there is no likelihood that a conductor 105 will contact the lubricant, if any, collected in the bottom of the chamber 52.

The conductive rings 32 and 35 of the secondary switch S2, Figs. 4 and 12, are electrically connected to conductors 115 and 116 respectively which are attached to the binding posts 34 and 37 of the switch S2. These conductors respectively lead to the windings of what, in this instance, are slow-to-release relays SR1 and SR2, the other ends of these relay windings being connected by conductors 117 and 118 to a common conductor 119 leading to one terminal of a battery B1. The other terminal of this battery is connected by a conductor 120 to a contact 121 of the pressure switch 102. When fluid under pressure is admitted by the control valve 95 to produce a predetermined minimum braking pressure in the brake cylinder 92, the pressure switch 102 is actuated and establishes an electrical connection between the contact 121 and another contact 122 which is connected by a conductor 123 to the binding post as 34, Fig. 4, of the master switch S1 (the conductor 123 being represented in Fig. 12 as being directly connected to the conductive ring 32 of the switch S1). The conductors 115, 116, 120 and 123 are contained in a conduit 124, Fig. 1, leading from the junction box 112.

Ordinarily the rotors of the switches S1 and S2, and consequently the brushes mounted therein, rotate substantially in timed relation with each other, such slight difference in rotative speeds as may exist being due primarily to differences in wheel diameters. However, if in the course of a braking operation there arises a tendency for one of the wheels to slide along the rail, such wheel tends to lose its rotative speed at a substantially greater rate than does the other wheel, which may be rolling in a normal manner along the rail. This brings about such lack of timed relation in the rotative movement of the rotors of the associated switches S1 and S2 that the brushes 79 of the master switch S1 to move into electrical contact with the sets of brushes 78 and 79 of the secondary switch S2 in rapid alternation, through the medium of the conductors 105 interconnecting the commutator bars 30 of these switches. Each time the brushes 79 of the switch S1 electrically contact the brushes 79 of the switch S2, a circuit is completed from battery B1 through conductors 119 and 117, winding of relay SR1, conductor 115, conductive ring 32 of switch S2, brushes 77 and 79, commutator bars 30, conductors 105, commutator bars 30 of switch S1, brushes 79 and 77, ring 32, conductor 123, pressure switch contacts 122 and 121 and conductor 120 back to battery B1. Thereupon the slow-to-release relay SR1 energizes and closes its contact 125, which contact is normally open prior to the time when the relay SR1 is energized. Similarly, when the brushes 79 of the master switch S1 move into electrical contact with the brushes 78 of the secondary switch S2 a circuit is completed from the battery B1 through the winding of slow-to-release relay SR2, ring 35 and brushes 75 and 78 of the switch S2, conductors 105, ring 32 and brushes 77 and 79 of the switch S1, and the pressure switch contacts 121 and 122 to cause the energization of relay SR2 and consequent closure of the normally open contact 126 of this relay. The relays SR1 and SR2 are repeatedly energized in rotation so long as the rotors of the switches S1 and S2 are rotating out of timed relation with each other, the frequency with which the relays are so energized being proportionate to the difference in rotative speeds of the wheels. Because of the slow-to-release characteristics of these relays, each relay maintains its contact 125 or 126 closed for at least a predetermined time even though the energizing circuit through the winding of such relay is broken.

The release times of the relays SR1 and SR2 are so adjusted that these relays are never concurrently in their operative positions except when the aforesaid difference in rotative speeds of the wheels exceeds a predetermined limit, this limit being selected so as to allow for a certain normal discrepancy in speeds which may be caused, for example, merely by differences in wheel diameter and not by any tendency of the wheels to slide. When a substantial tendency toward wheel sliding develops, however, the difference in rotative speeds of the rotors of the switches S1 and S2 become so great and the relays SR1 and SR2 are energized with such frequency that their release periods overlap. In such event the contacts 125 and 126 are both closed during at least a part of the time that the master switch brushes 79 are making a turn relative to the brushes of the secondary switch S2.

In this instance, the relay contacts 125 and 126 are embodied in a series circuit which extends from conductor 120 through conductor 127, relay contact 125, conductor 128, relay contact 126, and conductor 129 to the winding of slow-to-release relay SR3, thence through the conductor 119 to the battery B1. When both the relay contacts 125 and 126 are concurrently closed, this circuit is completed and relay SR3 is energized to close its normally open contact 130. Such concurrent closure of relays 125 and 126, as has been explained hereinabove, can take place only when the degree of relative rotation of the wheels, whose relative speeds are being compared, is such that a relay SR1 or SR2 is energized and closes its contact during the interval while the other relay of this pair is maintaining its contact closed. Closure of the contact 130 of relay SR3 establishes a circuit from battery B2 through conductor 131, contact 130, conductor 132, winding of solenoid 101 and conductor 133 to ground and thence back to battery B2 which is grounded. (It will be understood that an actual ground connection to the frame of the vehicle need not be provided so long as there is some return path to the source of current B2, the word "ground" being used figuratively herein.) This effects energization of the solenoid 101 and causes the effectiveness of the brakes to be reduced, whereupon normal rolling of the wheels is restored. So long as the pressure in the brake cylinder 92 is not reduced below the minimum required to operate the pressure switch 102 and the difference in wheel speeds is sufficiently great to produce some overlap in the periods of closure of the contacts of the relays SR1 and SR2, the relay SR3 will remain continuously energized to maintain the solenoid 101 energized. Thus, by providing a relay SR3, I avoid intermittently releasing and reapplying the brakes when the difference in wheel speeds assumes certain critical values, thereby affording greater smoothness of operation and, furthermore, a control operation is effected for at least a certain period of time, the release time of the relay SR3.

When the brakes are released in the manner just described and normal rolling of the wheels is reestablished, the rotors of the switches S1 and S2 commence to rotate substantially in timed relation with each other so that the relays SR1 and SR2 are energized, if at all, only at comparatively infrequent intervals and there is no overlap in the periods of closure of the contacts of the relays SR1 and SR2. Hence the series circuit through the contacts of these relays to the winding of relay SR3 is interrupted and remains open so that relay SR3 ultimately deenergizes and releases its contact 130, breaking the circuit to solenoid 101. Fluid under pressure is thereupon enabled to flow through pipe 99 to the brake cylinder 92 (provided, in the present instance, the operating handle 98 of brake valve 94 is still in brake application position) and a reapplication of the brakes follows. If a condition tending toward wheel sliding should again arise, the above described operations culminating in the actuation of the vent-check valve 100 are repeated a substantial time before any actual wheel sliding occurs.

The form of the invention thus far described is that which is particularly adaptable for use with a journal box of the character illustrated, for example, in Figs. 2 and 3. It will be understood, however, that the invention may be used with other styles of journal boxes and particularly with other styles of journal box covers, and an example of this is illustrated in Fig. 13 where a journal box Ba and the axle Aa are illustrated. This journal box includes a cover 140 that is fast over the open end of the box Ba and which is retained in position by nut and bolt structures 141, a gasket 142 being interposed between a face on the box and a flange on the cover 140 for a purpose well-understood in the art. Moreover, in this form of the invention a somewhat different connection than that described hereinabove is afforded between the rotor of my novel switch and the axle Aa.

Thus, for example, by referring to Figs. 3 and 13 it will be seen that the shaft 40 of the form of the invention shown in Fig. 3 is supplanted, in the form of the invention shown in Fig. 13, by a shaft 143 somewhat in the form of a sleeve which extends through an oil seal 144 similar to the oil seal 51, Fig. 3. A sleeve of resilient material as 145 is confined in a bore that extends inwardly from the free end of the shaft 143, and the reduced end 146 of a shaft 147 is mounted in the resilient sleeve 145. A splined collar 148 is fast on the shaft 147 at the end thereof opposite the reduced end portion 146 and this splined collar is mounted in an interiorly splined sleeve 149 fast in a bore 150 that extends inwardly from the adjacent end of the axle Aa.

It will be noted that the shaft 143 is rotatable in a ball bearing 151 which, like the ball bearing 42, Fig. 3, is mounted in a hub 41a that is secured to a boss or sleeve like the boss or sleeve 20 of the cover 15. Moreover, the sleeve 20a of the cover 140, instead of extending interiorly of the cover as does the sleeve 20, Fig. 3, projects exteriorly of the cover and has a lid or cap like the lid or cap 66, fast to the free end thereof in the manner in which this is shown, for example, in Fig. 3. Moreover, it will be understood that the stator of the switch partially shown in Fig. 13 may be secured in the sleeve 20a in the manner in which the stator shown in Fig. 3 is secured in the sleeve 20 there shown.

It will be understood that when the bolt and nut structures 141 are loosened and the cover plate 140 is removed, the splined collar 148 may be slid from the interiorly splined sleeve 149 and therefore the shaft 147 and my novel switch structure may be removed with the cover plate 140 as a unit. Likewise, when the cover plate 140 is reinstalled, the splined collar 148 will again be inserted into the interiorly splined sleeve 149. Furthermore, the resilient sleeve 145 affords a flexible interconnection between the shaft 147 and the shaft 143 to compensate for misalignment between the rotor of the switch shown in Fig. 13 and the axle Aa.

It will be seen from the foregoing that my novel switch may be used with journal boxes, and particularly journal box covers, of different designs. Likewise, it will be appreciated from a comparison of Figs. 3 and 13 that the rotor of my novel switch structure may be connected with an axle in different ways but it will be preferable in each such instance to afford some flexibility in the interconnection between the rotor and the axle so as to compensate for any misalignment between the rotor and axle, particularly that which may arise in the course of rotation of the axle and the rotor.

Moreover, it will be understood that while I have shown and described a particular manner of constructing the rotor and stator of my novel switch, resort could be had to other arrangements and, if desired, rather than, for example, constructing either or both of these parts of separable units and suitable joining such units together, these parts might be molded in one piece or, as will be appreciated, they could be formed of separate pieces and joined together other than in the manner herein described for my invention does not necessarily reside in the particular manner in which the rotor and stator of my novel switch are mechanically constructed.

It will be apparent from the foregoing that the present invention enables certain of the elements of a control apparatus to be operatively associated with the wheels of railway and like equipment in a simple and effective manner whereby installation and service are materially facilitated and reliability of performance is assured. Moreover, it will be evident that the present invention enables the electrical elements, such as the commutator switch S1 or S2, to be removed bodily with the journal box cover thereby to afford ready access to the journal box, while if only the electrical connections of the control apparatus are to be inspected, this may be accomplished merely by removal of the lid element from the journal box cover.

Furthermore, while I have shown in Fig. 12 a particular arrangement of relays as SR1, SR2 and SR3 which operate in response to the detection of a condition tending toward wheel sliding to effect a control operation such as releasing the brakes, there are other arrangements of relays such as are shown, for example, in my aforesaid patents, Nos. 2,232,750 and 2,232,752 which may be equally well employed for this purpose and, moreover, other devices could be operated under control of the novel detecting means of the present invention.

The elements of the control apparatus which are thus mounted in an operative association with the wheels of the railway equipment may be readily moved into their operative association with the end of the axle merely by an endwise approaching movement toward the axle, and hence installation, inspection and repair of the apparatus are facilitated.

Thus, while I have illustrated and described selected embodiments of my invention as applied to a particular type of control apparatus and as constructed where a commutator type switch is to be associated with a railway wheel, it is to be understood that such disclosure is primarily illustrative and that changes may be made by those skilled in the art to adapt the invention to the other types of control apparatus and for similarly mounting other types of electrical apparatus or switches without departing from the spirit and scope of the invention as defined in the appended claims.

I claim:

1. In railway equipment and the like having control operation effecting means effective when operated to counteract wheel sliding tendencies in said equipment and which equipment embodies a wheel and axle assembly with a journal box supported about a projecting end of the axle, the combination of detecting means for initiating operation of said control operation effecting means and including a cover for said journal box adapted to be secured on said journal box in opposed relation to said end of said axle, means providing a pair of spaced bearings in said cover in alignment with the axle, a shaft journaled in said bearings and having one end projecting toward said end of said axle, means affording a separable driving connection between adjacent ends of said shaft and said axle and adapted for interengagement when said shaft is moved endwise toward said axle in the mounting of said cover on said journal box, and electrical means mounted at least in part on said shaft between said bearings for operation by said shaft and having circuit means associated therewith for governing operation of said control operation effecting means.

2. In an apparatus for detecting the need of a control operation with respect to wheels on railway or like equipment that decelerate in the course of a braking operation of such equipment and including automatic means operable to reduce the tendency of at least one of said wheels to slide in the course of such a braking operation and wherein the equipment includes a plurality of axles on which the wheels are respectively mounted and also a plurality of journal boxes each carried by a respective axle outwardly of a wheel thereon, the combination of covers for said journal boxes each removably attached to the outwardly disposed face of its journal box and extending over the outer end of the associated axle, devices respectively supported within said covers and bodily movable therewith to and from association with the respective axles, each of said devices comprising a pair of members one of which is rotatable relative to the other and electrical contact elements which are brought into engagement by relative rotation of said members, means releasably connecting the rotatable members of said devices respectively to said axles for rotation therewith, and electrically operated means under control of the contact elements of said devices and governing said automatic means to initiate operation of said automatic means.

3. In an apparatus for detecting the need of a control operation with respect to wheels or the like on railway equipment that decelerate in the course of a manually controlled braking operation of such equipment and including automatic means operable to reduce the tendency of at least one of said wheels to slide in the course of such a braking operation and which equipment embodies a plurality of axles on which said wheels are respectively mounted and a plurality of journal boxes each carried by a respective axle outwardly of a wheel thereon, the combination of covers for said journal boxes each removably attached to the outwardly disposed face of its journal box and extending over the outer end of the associated axle, commutator switches respectively mounted interiorly of said covers and each including a stator supported by the respective cover and a cooperating rotor directly connected to the associated axle for rotation therewith, said stator comprising a series of circularly arranged commutator bars and said rotor including brushes arranged to have wiping contact with said bars, conductors electrically interconnecting corresponding commutator bars of said switches, and electrically operated means connected in circuit with the brushes of said switches and governing said automatic means.

4. In railway equipment and the like having electrically operable control operation effecting means effective when operated to counteract wheel sliding tendencies in said equipment and said equipment embodying a wheel and axle assembly with a journal box supported about a projecting end of the axle, the combination of a cover for said journal box accurately interfitting therewith and secured thereto and extending a substantial distance outwardly beyond the end of said axle, a commutator switch positioned interiorly of said cover and supported thereby and including a stator and a rotor, said stator comprising a series of commutator bars arranged consecutively in a circle and at least one conductive ring insulated from said commutator bars, said rotor comprising a rotatable member disposed interiorly of said stator and carrying conductive brushes arranged to have wiping contact with said ring and said commutator bars respectively, means electrically interconnecting said brushes, a shaft carrying said rotor and journaled in said cover in axial alignment with said axle, means coupling said shaft to said axle for rotation therewith, and means electrically connected in circuit with said brushes, said ring and said commutator bars and operable to govern said control operation effecting means.

5. In railway equipment and the like having control operation effecting means effective when operated to counteract wheel sliding tendencies in said equipment and said equipment embodying a wheel and axle assembly and having a journal box supported about a projecting end of the axle and having an open outer side through which the interior of said journal box and the end of said axle are exposed and accessible, the combination of detecting means for initiating operation of said control operation effecting means and including a cover for said journal box adapted to be secured on said journal box in opposed relation to said end of said axle, an internal axial sleeve within said cover and having an open outer end, a lid for closing said open end of said sleeve, means providing a pair of spaced bearings aligned with said axle and supported on said lid and the inner end of said sleeve respectively, a shaft journaled in said bearings and having one end projecting toward said end of said axle, means forming a separable driving connection on adjacent ends of said shaft and said axle adapted for interengagement when said shaft is moved endwise toward said axle in the mounting of said cover on said journal box, and electrical means mounted at least in part on said shaft between said bearings for operation by said shaft, and circuit means associated with said electrical means and governing said control operation effecting means for initiating operation thereof.

6. In railway equipment and the like having electrically operable control operation effecting means effective when operated to counteract wheel sliding tendencies in said equipment and said equipment embodying a wheel and axle assembly with a journal box supported on and about a projecting end of the axle, the combination of a cover for said journal box accurately interfitting therewith and secured thereto and extending a substantial distance outwardly beyond the end of said axle, said cover having an open outer end, a lid for closing said end, an internal axial sleeve extending from said open end of said cover and toward said axle, a commutator switch positioned interiorly of said sleeve and including a stator supported by said sleeve and a rotor supported by said sleeve and said lid, said stator comprising a series of commutator bars arranged consecutively in a circle and at least one conductive ring insulated from said commutator bars, said rotor comprising a rotatable member disposed interiorly of said stator and carrying conductive brushes arranged to have wiping contact with said ring and said commutator bars respectively, means electrically interconnecting said brushes, means coupling said rotor to said axle for rotation therewith, governing means operable to govern said control operation effecting means, and electrical conductors connected to said governing means and connected to said ring and said brushes at points within said sleeve and adjacent to the outer end thereof so as to be accessible when said lid is removed.

7. In railway equipment and the like having electrically operable control operation effecting means effective when operated to counteract wheel sliding tendencies in said equipment and said equipment embodying a wheel and axle assembly with a journal box supported about a projecting end of the axle, the combination of a cover for said journal box accurately interfitting therewith and secured thereto and extending a substantial distance outwardly beyond the end of said axle, said cover having an open outer end, a lid for closing said end, an internal axial sleeve extending from said open end of said lid and toward said axle, switch means positioned interiorly of said sleeve and supported thereby and including a fixed member supported by said sleeve and a rotatable member supported by said sleeve and said lid, means couping said rotor to said axle for rotation therewith, governing means operable to govern said control operation effecting means, and at least one electrical conductor connected to said governing means and connected to said fixed member at a point within said sleeve and adjacent to the outer end thereof so as to be accessible when said lid is removed.

8. In railway equipment and the like having electrically operable control operation effecting means effective when operated to counteract wheel sliding tendencies in said equipment and said equipment embodying a wheel and axle assembly with a journal box supported on and about a projecting end of the axle, the combination of a cover for said journal box secured thereto and extending a substantial distance outwardly beyond the end of said axle, said cover having an open outer end, a lid for closing said open outer end, an internal axial sleeve extending from said open end of said cover and toward said axle, an electrical device positioned interiorly of said sleeve and including a stator supported by said sleeve and a rotor supported by said sleeve and said lid, means coupling said rotor to said axle for rotation therewith, governing means operable to govern said control operation effecting means, and at least one electrical conductor connected to said governing means and connected to said electrical device at a point within said sleeve and adjacent to the outer end thereof so as to be accessible when said lid is removed.

9. In railway equipment and the like having electrically operable control operation effecting means effective when operated to counteract wheel sliding tendencies in said equipment and said equipment embodying a wheel and axle assembly with a journal box supported on and about a projecting end of the axle, the combination of a cover for said journal box secured thereto and extending a substantial distance outwardly beyond the end of said axle, said cover having an internal axial sleeve spaced at one end from said axle and open at the other end, a lid detachably secured in closing relation to said other end, a communtator switch positioned within said axle sleeve and supported thereby and including a stator and a rotor, said stator comprising a series of commutator bars arranged consecutively in a circle and at least one conductive ring insulated from said commutator bars, said rotor comprising a rotatable member disposed interiorly of said stator and carrying conductive brushes arranged to have wiping contact with said ring and said commutator bars respectively, means electrically interconnecting said brushes, a shaft carrying said rotor disposed within said cover in axial alignment with said axle and journaled at one end on the inner surface of said lid, means detachably mounted on said one end of said axial sleeve and providing another bearing for said shaft, means coupling said shaft to said axle for rotation therewith, and means electrically connected in circuit with said brushes, said ring and said commutator bars and operable to govern said control operation effecting means.

10. In railway equipment and the like having electrically operable control operation effecting means effective when operated to counteract wheel sliding tendencies in said equipment and said equipment embodying a wheel and axle assembly with a journal box supported on and about a projecting end of the axle, the combination of a cover for said journal box accurately interfitting therewith and secured thereto and extending a substantial distance outwardly beyond the end of said axle, said cover having an internal axial sleeve spaced at one end from said axle and open at the other end, a lid detachably secured in closing relation to said other end, an electrical device positioned within said axial sleeve and including a stator and a rotor, means supporting said stator on said sleeve, a shaft carrying said rotor within said stator and journaled in said cover in axial alignment with said axle and journaled at one end on the inner surface of said lid, means detachably mounted on said one end of said axial sleeve and providing another bearing for said shaft, means coupling said shaft to said axle for rotation therewith, and means electrically connected in circuit with electrical device and operable to govern said control operation effecting means.

11. In railway equipment and the like having a wheel and axle assembly and wherein a journal box is supported on said axle outwardly of a wheel thereon, the combination of, a cover for said journal box accurately interfitting therewith and secured thereto and extending a substantial distance outwardly beyond the end of said axle, a commutator switch positioned interiorly of said cover and supported thereby and including a stator and a rotor, said stator comprising a series of commutator bars arranged consecutively in a circle and at least one conductive ring insulated from said commutator bars, said rotor comprising a rotatable member disposed interiorly of said stator and carrying conductive brushes arranged to have wiping contact with said ring and said commutator bars respectively, means electrically interconnecting said brushes, a shaft carrying said rotor and journaled in said cover in axial alignment with said axle, means coupling said shaft to said axle for rotation therewith, and means electrically connected in circuit with said brushes, said ring and said commutator bars and operable under control thereof in a manner indicative of a tendency toward slippage of said wheel when such a condition exists.

12. In an apparatus for detecting the need of a control operation with respect to wheels or the like on railway equipment that decelerate in the course of a braking operation of such equipment and including automatic means operable to effect a release of the brakes independently of the manual control and in which equipment a plurality of axles are embodied on which said wheels are respectively mounted and a plurality of journal boxes each carried by a respective axle outwardly of a wheel thereon, the combination of covers for said journal boxes each removably attached to the outwardly disposed face of its journal box and extending over the outer end of the associated axle, devices respectively supported within said covers and bodily movable therewith to and from association with the respective axles, each of said devices comprising a pair of members one of which is rotatable relative to the other and electrical contact elements which are brought into engagement by relative rotation of said members, means releasably connecting the rotatable members of said devices respectively to said axles for rotation therewith, and electrically operated means under control of the contact elements of said devices and governing said automatic means to effect release of the brakes whenever any of said wheels tends to slide.

13. In an apparatus for detecting the need of a control operation with respect to wheels or the like on railway equipment that decelerate in the course of a manually controlled braking operation of such equipment and including automatic means operable to effect a release of the brakes independently of the manual control and in which equipment a plurality of axles are provided on which said wheels are respectively mounted and a plurality of journal boxes are carried each by a respective axle outwardly of a wheel thereon, the combination of covers for said journal boxes each removably attached to the outwardly disposed face of its journal box and extending over the outer end of the associated axle, commutator switches respectively mounted interiorly of said covers and each including a stator supported by the respective cover and a cooperating rotor directly connected to the associated axle for rotation therewith, said stator comprising a series of circularly arranged commutator bars and said rotor including brushes arranged to have wiping contact with said bars, conductors electrically interconnecting corresponding commutator bars of said switches, and electrically operated means connected in circuit with the brushes of said switches and governing said automatic means to effect release of said brakes whenever there is a substantial difference in the rotative speeds of said wheels indicative of a condition tending toward wheel sliding.

14. In railway equipment and the like having electrically operable control operation effecting means effective when operated to counteract wheel sliding tendencies in said equipment and said equipment embodying a wheel and axle assembly with a journal box supported on and about a projecting end of the axle, the combination of a cover for said journal box accurately interfitting therewith and secured thereto and extending a substantial distance outwardly beyond the end of said axle, said cover having an open outer end, a lid for closing said open outer end, an internal axial sleeve extending from said open end and within said cover in an inward direction toward said axle, said sleeve having an internal flange adjacent to its inner end, an elecrtical device positioned interiorly of said sleeve and including a stator and a rotor, said stator having a projecting flange at one end adapted to be engaged with said internal flange on the side of said internal flange adjacent to said axle, a clamping plate secured on said sleeve and holding said flanges in an engaged relation thereby to support said stator in said sleeve, a shaft upon which said rotor is supported, bearings mounted on said lid and said clamping plate respectively and supporting said shaft, means coupling said shaft to said axle for rotation therewith, governing means operable to govern said control operation effecting means, and electrical conductors connected to said governing means and connected to said electrical device at points within said sleeve and adjacent to the outer end thereof so as to be accessible when said lid is removed.

15. In railway equipment and the like having electriaIly operable control operation effecting means effective when operated to counteract wheel sliding tendencies in said equipment and said equipment embodying a wheel and axle assembly with a journal box supported on and about a projecting end of the axle, the combination of a cover for said journal box accurately interfitting therewith and secured thereto and having an exterior wall extending a substantial distance outwardly beyond the end of said axle, said cover having an inturned flange defining an end opening for said cover, a lid for closing said end opening, an axial sleeve extending from said end opening and in an inward direction toward said axle to thereby define a chamber outside of said sleeve and within said wall of the cover for containing lubricant, said sleeve having an internal flange adjacent to its inner end, an electrical device positioned interiorly of said sleeve and including a stator and a rotor, said stator having a projecting flange at one end adapted to be engaged with said internal flange on the side of said internal flange adjacent to said axle so that the other end of said stator projects beyond said internal flange in spaced relation to said sleeve, a clamping plate secured on said sleeve and holding said flanges in an engaged relation thereby to support said stator in said sleeve, a shaft upon which said rotor is supported, bearings mounted on said lid and said clamping plate respectively and supporting said shaft, means on said clamping plate about said shaft to retard passage of oil along said shaft toward said electrical device, said stator, said internal flange and said flange of said stator being formed to provide a drain passage from a point adjacent said clamping plate to the space within said sleeve and beneath said stator, means coupling said shaft to said axle for rotation therewith, governing means operable to govern said control operation effecting means, and electrical conductors connected to said governing means and connected to said electrical device at points within said sleeve and adjacent to the outer end thereof so as to be accessible when said lid is removed.

16. In railway equipment and the like having electrically operable control operation effecting means effective when operated to counteract wheel sliding tendencies in said equipment and said equipment embodying a wheel and axle assembly with a journal box supported on and about a projecting end of the axle, the combination of a cover for said journal box secured thereto and having an exterior wall extending a substantial distance outwardly beyond the end of said axle, said cover having an inturned flange wall defining an end opening for said cover, a lid for closing said end opening, an axial sleeve extending from said flange wall and said end opening and in an inward direction toward said axle to thereby define a chamber outside of said sleeve and within said wall of the cover for containing lubricant, an electrical device positioned interiorly of said sleeve and including a stator and a rotor, means securing said stator in said sleeve and including a plate secured on the end of said sleeve adjacent to said axle, a shaft upon which said rotor is supported, bearings mounted on said lid and said plate respectively and supporting said shaft, means associated with said shaft to retard passage of oil along said shaft toward said electrical device, one of said walls having a plugged drain opening therein through which lubricant may be drained from said chamber down to a predetermined level established by the location of said drain opening, means coupling said shaft to said axle for rotation therewith, governing means operable to govern said control operation effecting means, and electrical conductors connected to said governing means and connected to said electrical device within said sleeve.

17. In railway equipment and the like having electrically operable control operation effecting means effective when operated to counteract wheel sliding tendencies in said equipment and said equipment embodying a wheel and axle assembly with a journal box supported on and about a projecting end of the axle, the combination of a cover for said journal box secured thereto and having an external wall extending a substantial distance outwardly beyond the end of said axle, said external wall having an inturned flange defining a central end opening, a lid for closing said end opening, an axial sleeve extending from said end opening and in an inward longitudinal direction toward said axle, an electrical device positioned interiorly of said sleeve and including a stator and a rotor, said stator being mounted stationarily within said sleeve, a plate secured on the end of said sleeve adjacent to said axle, a shaft upon which said rotor is supported slidably but non-rotatably, bearings mounted on said lid and said plate respectively and supporting said shaft, means coupling said shaft to said axle for rotation therewith, governing means operable to govern said control operation effecting means, electrical conductors connected to said governing means and connected to said electrical device, and spring means acting between said lid and said rotor to maintain said rotor in a predetermined longitudinal position on said shaft.

18. In railway equipment and the like having electrically operable control operation effecting means effective when operated to counteract wheel sliding tendencies in said equipment and said equipment embodying a wheel and axle assembly with a journal box supported on and about a projecting end of the axle, the combination of a cover for said journal box secured thereto and having an external wall extending a substantial distance outwardly beyond the end of said axle, said external wall having an inturned flange defining a central end opening, a lid for closing said end opening, means defining a stationary support within said external wall, an electrical device positioned interiorly of said cover and including a stator and a rotor, said stator being mounted stationarily within said wall and on said support, a shaft upon which said rotor is supported slidably but non-rotatably whereby said rotor may be withdrawn endwise from said shaft and out of said end opening, bearings mounted on said lid and said support respectively and supporting said shaft, means coupling said shaft to said axle for rotation therewith, governing means operable to govern said control operation effecting means, electrical conductors connected to said governing means and said electrical device, and spring means acting between said lid and said rotor to maintain said rotor in a predetermined longitudinal position on said shaft.

19. In railway equipment and the like having electrically operable control operation effecting means effective when operated to counteract wheel sliding tendencies in said equipment and said equipment embodying a wheel and axle assembly with a journal box supported on and about a projecting end of the axle, the combination of a cover for said journal box secured thereto and having an external wall extending a substantial distance outwardly beyond the end of said axle, said external wall having an inturned flange defining a central end opening in said cover, a lid for closing said end opening, a support formed within said cover, an electrical device positioned interiorly of said cover and including a stator and a rotor, said stator being mounted stationary on said support, a bearing carried on said support intermediate said lid and the end of said axle, an aligned bearing on said lid, a shaft supported in said bearings and detachably coupled to said axle for rotation therewith, said stator being formed from two separate bodies of insulating material separable in a transverse plane, and in one of which a radial brush slot is formed in the end surface facing toward the other of said bodies, a spring biased brush in said brush slot, means for holding said separable bodies together to hold said brush in place in said slot and thereby form said rotor, means on said rotor and on said shaft engageable by longitudinal movement to connect said rotor to said shaft for rotation with said shaft, said rotor being withdrawable endwise from said shaft when said lid is removed, and means on said lid operable to hold said rotor longitudinally in position on said shaft when said lid is in place.

20. In railway equipment and the like having electrically operable control operation effecting means effective when operated to counteract wheel sliding tendencies in said equipment and said equipment embodying a wheel and axle assembly with a journal box supported on and about a projecting end of the axle, the combination of a cover for said journal box secured thereto and having an external wall extending a substantial distance outwardly beyond the end of said axle, said external wall having an inturned flange defining a central end opening in said cover, a lid for closing said end opening, a support formed within said cover, an electrical device positioned interiorly of said cover and including a stator and a rotor, said stator being mounted stationarily on said support, a bearing carried on said support intermediate said lid and the end of said axle, an aligned bearing on said lid, a shaft supported in said bearings and detachably coupled to said axle for rotation therewith, said stator comprising a main body and a separate end plate formed from insulating material, said main body having a pair of parallel radial brush slots formed therein with one of said slots formed in the end surface facing toward said end plate and the other of said slots being formed in spaced relation to said one slot between said one slot and the other end of said main body, spring biased brushes in said brush slots, means for holding said separable bodies together to hold one of said brushes in place in said one slot and thereby form said rotor, a conductor connecting said brushes, said main body having a narrow radial slot formed therein through which said conductor extends and through which said conductor may be withdrawn radially when said brushes are withdrawn from said slots, means on said rotor and on said shaft engageable by longitudinal movement to connect said rotor to said shaft for rotation with said shaft, said rotor being withdrawable endwise from said shaft when said lid is removed, and means on said lid operable to hold said rotor in position when said lid is in place.

21. In railway equipment and the like having electrically operable control operation effecting means effective when operated to counteract wheel sliding tendencies in said equipment and said equipment embodying a wheel and axle assembly with a journal box supported on and about a projecting end of the axle, the combination of a cover for said journal box secured thereto and having an external wall extending a substantial distance outwardly beyond the end of said axle, said external wall having an inturned flange defining a central end opening in said cover, a lid for closing said end opening, a support formed within said cover, an electrical device positioned interiorly of said cover and including a stator and a rotor, said stator being mounted stationarily on said support, a bearing carried on said support intermediate said lid and the end of said axle, an aligned bearing on said lid, a shaft supported in said bearings and detachably coupled to said axle for rotation therewith, said stator comprising a main body and a separate end plate formed from insulating material, said main body having a pair of parallel radial brush slots formed therein with one of said slots formed in the end surface facing toward said end plate and the other of said slots being formed in spaced relation to said one slot between said one slot and the other end of said main body, spring biased brushes in said brush slots, means for holding said separable bodies together to hold one of said brushes in place in said one slot and thereby form said rotor, a conductor connecting said brushes, said main body having a narrow radial slot formed therein through which said conductor extends and through which said conductor may be withdrawn radially when said brushes are withdrawn from said slots, means on said rotor and on said shaft operable to connect said rotor to said shaft for rotation therewith.

22. In railway equipment and the like having control operation effecting means effective when operated to counteract wheel sliding tendencies in said equipment and which equipment embodies a wheel and axle assembly with a journal box supported about a projecting end of the axle and said end of said axle having an internally splined axial socket formed therein, the combination of means for initiating operation of said control operation effecting means and including a cover for said journal box adapted to be secured on said journal box in opposed relation to the end of said axle, bearing means on said cover in alignment with the axle, a mounting shaft journaled in said bearing means and having one end projecting toward said end of said axle, electrical means mounted at least in part on said mounting shaft for operation by said mounting shaft and having circuit means associated therewith for governing operation of said control operation effecting means, and means forming a driving connection between said axle and said mounting shaft and comprising a stub shaft having an externally splined head at one end adapted for endwise insertion into or withdrawal from said splined socket, and flexible means connecting the other end of said stub shaft with said projecting end of said mounting shaft, said flexible connecting means comprising a sleeve of resilient material embracing the end portion of one of said shafts, and means on the other of said shafts defining a socket snugly embracing said sleeve.

23. In railway equipment and the like having control operation effecting means effective when operated to counteract wheel sliding tendencies in said equipment and which equipment embodies a wheel and axle assembly with a journal box supported about a projecting end of the axle and said end of said axle having an internally splined axial socket formed therein, the combination of means for initiating operation of said control operation effecting means and including a cover for said journal box adapted to be secured on said journal box in opposed relation to the end of said axle, bearing means on said cover in alignment with the axle, a mounting shaft journaled in said bearing means and having one end projecting toward said end of said axle, electrical means mounted at least in part on said mounting shaft for operation by said mounting shaft and having circuit means associated therewith for governing operation of said control operation effecting means, a stub shaft disposed in a substantially axial relation to said mounting shaft, a resilient sleeve having internal and external surfaces, means on adjacent ends of said shafts snugly engaging said internal and external surfaces respectively of said resilient sleeve to thereby support said stub shaft on said mounting shaft and form a resilient driving connection therebetween, and an externally splined head on the other end of said stub shaft drivingly engaged with said splined socket.

24. In railway equipment and the like having control operation effecting means effective when operated to counteract wheel sliding tendencies in said equipment and said equipment embodying a wheel and axle assembly and having a journal box supported about a projecting end of the axle and having an open outer side through which the interior of said journal box and the end of said axle are exposed and accessible, the combination of detecting means for initiating operation of said control operation effecting means and including a cover for said journal box adapted to be secured on said journal box in opposed relation to said end of said axle, said cover being of substantial length in a direction longitudinally of said axle and being formed with an open outer end, a lid for closing the open outer end of said cover, means providing a stationary support within said cover and located intermediate and in spaced relation to said axle and said lid, means providing spaced bearings axially aligned with said axle and carried on said support and on said lid, a shaft journaled in said bearings and having one end projecting toward said end of said axle, means forming a separable driving connection on adjacent ends of said shaft and said axle adapted for interengagement when said shaft is moved endwise toward said axle in the mounting of said cover on said journal box, and electrical means mounted at least in part on said shaft between said bearings for operation by said shaft, and circuit means associated with said electrical means and governing said control operation effecting means for initiating operation thereof.

25. In railway equipment and the like having electrically operable control operation effecting means effective when operated to counteract wheel sliding tendencies in said equipment and said equipment embodying a wheel and axle assembly with a journal box supported on and about a projecting end of the axle, the combination of a cover for said journal box secured thereto and extending a substantial distance outwardly beyond the end of said axle, said cover having an open outer end, a lid for closing said open outer end, a rigid support formed within said cover, an electrical device positioned within said cover and including a stator carried in a stationary relation on said support and a rotor carried and rotatably supported at spaced points upon said support and said lid respectively, means coupling said rotor to said axle for rotation therewith, governing means operable to govern said control operation effecting means, and at least one electrical conductor connected to said governing means and connected to said electrical device at a point within said cover and adjacent to the outer end thereof so as to be accessible when said lid is removed.

26. In railway equipment and the like having electrically operable control operation effecting means effective when operated to counteract wheel sliding tendencies in said equipment and said equipment embodying a wheel and axle assembly with a journal box supported on and about a projecting end of the axle, the combination of a cover for said journal box accurately interfitting therewith and secured thereto and extending a substantial distance outwardly beyond the end of said axle, said cover having an internal mounting means therein, and said cover being open at its outer end, a lid detachably secured in closing relation to said outer end, an electrical device positioned within said cover and including a stator and a rotor, means securing said stator on said mounting means, bearing means supported on said mounting means and held in position thereon by said securing means, said bearing means supporting said rotor at a point spaced substantially from said lid, means coupling said rotor to said axle for rotation therewith, and means electrically connected in circuit with electrical device and operable to govern said control operation effecting means.

27. In railway equipment and the like having electrically operable control operation effecting means effective when operated to counteract wheel sliding tendencies in said equipment and said equipment embodying a wheel and axle assembly with a journal box supported on and about a projecting end of the axle, the combination of a cover for said journal box accurately interfitting therewith and secured thereto and extending a substantial distance outwardly beyond the end of said axle, said cover having an open outer end, a lid for closing said open outer end, an internal support within said cover providing an inwardly extending mounting flange substantially coaxial with said axle and spaced from said axle and from said lid, an electrical device positioned interiorly of said cover and including a stator and a rotor, said stator having a projecting flange thereon adapted to be engaged with said mounting flange on the side of said mounting flange adjacent to said axle, a clamping plate secured on said support and holding said flanges in an engaged relation thereby to support said stator in said cover, a shaft upon which said rotor is supported, bearings mounted on said lid and said clamping plate respectively and supporting said shaft, means coupling said shaft to said axle for rotation therewith, governing means operable to govern said control operation effecting means, and electrical conductors connected to said governing means and connected to said electrical device at points within said cover and adjacent to the outer end thereof so as to be accessible when said lid is removed.

28. In railway equipment and the like having electrically operable control operation effecting means effective when operated to counteract wheel sliding tendencies in said equipment and said equipment embodying a wheel and axle assembly with a journal box supported on and about a projecting end of the axle, the combination of a cover for said journal box secured thereto and having an external wall extending a substantial distance outwardly beyond the end of said axle, said cover having an open outer end, a lid for closing said open end, means defining a stationary support within said external wall, an electrical device positioned interiorly of said cover and including a stator and a rotor, said stator being mounted stationarily within said wall and on said support, a shaft upon which said rotor is supported slidably but nonrotatably whereby said rotor may be withdrawn endwise from said shaft and out of said end opening, bearings mounted on said lid and said support respectively and supporting said shaft, means coupling said shaft to said axle for rotation therewith, governing means operable to govern said control operation effecting means, electrical conductors connected to said governing means and said electrical device, and spring means acting between said lid and said rotor to maintain said rotor in a predetermined longitudinal position on said shaft.

29. In railway equipment and the like having control operation effecting means effective when operated to counteract wheel sliding tendencies in said equipment and which equipment embodies a wheel and axle assembly with a journal box supported about a projecting end of the axle and said end of said axle having a non-circular drive socket formed on the end thereof, the combination of means for initiating operation of said control operation effecting means and including a cover for said journal box adapted to be secured on said journal box in opposed relation to the end of said axle, bearing means on said cover in alignment with the axle, a mounting shaft journaled in said bearing means and having one end projecting toward said end of said axle, electrical means housed within said cover and operatively associated with said shaft and having circuit means associated therewith for governing operation of said control operation effecting means, and means forming a driving connection between said axle and said shaft and comprising a stub shaft having head at one end substantially complemental to and adapted for endwise insertion into or withdrawal from said socket, and flexible means connecting the other end of said stub shaft with said projecting end of said first mentioned shaft, said flexible connecting means comprising a sleeve of resilient material embracing the end portion of one of said shafts, and means on the other of said shafts defining a socket snugly embracing said sleeve.

ROSSER L. WILSON.